Nov. 24, 1959     P. F. SMITH     2,914,350

EXTREME TEMPERATURE SEALING DEVICE

Filed Aug. 30, 1957

INVENTOR.
PAUL F. SMITH
BY Fulwider Mattingly & Huntley
Attorneys

United States Patent Office 2,914,350
Patented Nov. 24, 1959

2,914,350

EXTREME TEMPERATURE SEALING DEVICE

Paul F. Smith, Pacific Palisades, Calif., assignor to Parker-Hannifin Corporation, Cleveland, Ohio, a corporation of Ohio Application August 30, 1957, Serial No. 681,388

9 Claims. (Cl. 288—32)

This invention relates to a fluid sealing device adapted to seal between abutting surfaces, and more particularly to a seal of this kind which can be used in either very high or very low temperature systems.

Sealing devices using elastomeric compounds are limited in their application to a temperature range of approximately —65° F. to 400° F. Above and below these points the sealing compounds lose sealing pressure and leakage occurs. In modern high performance aircraft and missiles, sealing must occur under conditions wherein the temperatures may go as high as 1200° F. and as low as —300° F. It is with such sealing conditions that the present invention is concerned.

The present seal preferably includes as a sealing or packing member a hollow O ring which is formed of metal or other material suitable for withstanding the temperatures encountered. This O ring is somewhat resilient within a limited range of deformation and is capable of exerting sealing pressure against confining surfaces to form lines or bands of sealing contact. It will be appreciated, however, that compared to rubber O rings, a metallic O ring has very little resilience and a very limited range of deformation in which to maintain sealing pressure. In the use of a metallic O ring careful consideration must therefore be given to the volumetric relationship between the O ring and the void space in which it is confined.

A study has been made of the use of a metallic O ring in a confining groove formed in one abutting part and closed by the surface of the other abutting part which is to be sealed. This study and experimentation indicates that the changes in volumetric relationship due to expansion and contraction of the confining parts and the O ring may exceed the range in which the O ring will maintain sealing contact, and leakage thus occurs.

The present invention contemplates confining the O ring between retaining members which are preferably formed separate from the surfaces between which the seal is to be made. These retaining members are formed of selected dissimilar materials having different coefficients of expansion, and may therefore be made to expand and contract relative to each other. The effect of this is to change the dimensions of the void space in which the O ring is confined in such a manner as to maintain sealing pressure at all times. Specific embodiments of the invention adapted for high and low temperature installations will hereinafter be described in detail.

With the foregoing in mind it is a major object of this invention to provide a high pressure sealing device adapted for use in either high or low extreme temperature conditions.

It is also an object of the invention to provide a sealing device utilizing the differential expansion and contraction of dissimilar materials to maintain or increase sealing pressure under extreme temperature conditions.

A further object of the invention is to provide a multiple part sealing device having selected differential expansion and contraction materials for particular use with the materials of the parts to be sealed and the securing fasteners.

Another object of the invention is to provide a sealing device of the character described which may take different embodiments for sealing installation of various kinds.

These and other objects and advantages of the invention will become apparent from the following detailed description of preferred and modified forms thereof, and from an inspection of the accompanying drawings in which.

Figure 1:
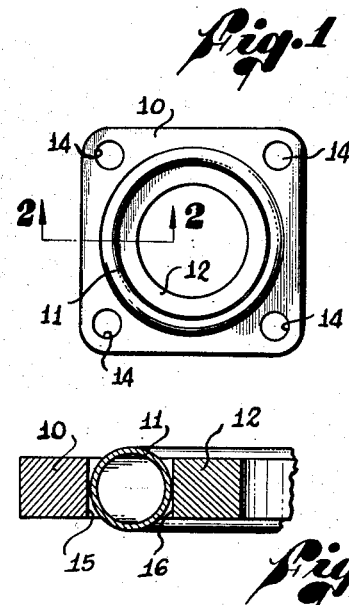
Fig. 1 is a plan view of a preferred form of the invention.
Figure 2:
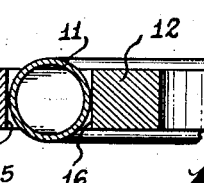
Fig. 2 is a sectional detail taken along the line 2—2 of Fig. 1.

Referring now to the drawing and particularly to Figs. 1 and 2 thereof, the preferred embodiment of the invention is seen to include an outer flat retaining member 10, a sealing ring 11, and an inner retaining member 12 which is also flat and of a thickness equal to that of outer member 10. Members 10 and 12 are formed of hard rigid materials adapted to withstand high fluid pressures and may be typically formed of different metals as will subsequently be described in more detail. The ring 11 is of hollow torus shape and is formed of a semi-rigid material, that is one which will maintain its resilience under the extreme temperature of usage. As was previously discussed, elastomeric compounds are not suitable for extreme temperature usage, and by forming the ring 11 as a hollow metallic member having a relatively thin wall it can be made to have the desired resilient characteristics and still withstand the installation temperatures.

The outer or overall shape of retaining member 10 conforms to the shape of the housing or flanged members with which the seal is to be used. As shown it is typically of square configuration conforming to the flange shape of standard aircraft high pressure fluid fittings. Spaced around the outer periphery of member 10 are a plurality of bolt or fastener holes 14 which receive fasteners for tightening the flanges in place. The inner periphery of member 10 is of circular shape forming a short cylindrical wall 15 which is adapted to engage with the outer periphery of the torus shaped ring 11. Inner ring 12 is of annular shape having a circular outer edge which forms a short cylindrical wall 16 opposing wall 15, and is adapted to engage the inner peripheral surface of ring 11.

Figure 3:
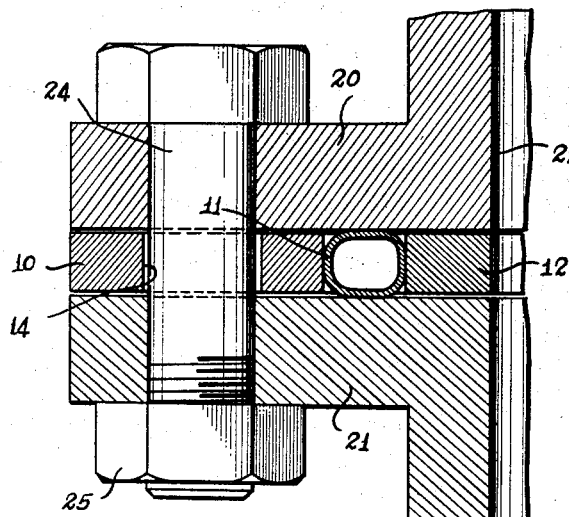
Fig. 3 is a sectional detail showing the installation of the preferred device under normal installation temperature.

As is best seen in Fig. 2, members 10 and 12 are of considerably less thickness than the cross sectional thickness of ring 11, and the walls 15 and 16 define therebetween an annular channel which is of rectangular cross section and has at room temperature a volume substantially equal to the volume of ring 11. The installation of the device shown in Figs. 1 and 2 is illustrated in Fig. 3, wherein the composite seal is placed between flanges 20 and 21 of typical fluid fittings having an internal high pressure fluid passageway 22. Flanges 20 and 21 are tightened on retaining members 10 and 12 and the ring 11 by securing bolts 24 held in place by nuts 25.

In order to prevent high pressure fluid leakage from the passageway 22 it is necessary to provide lines of sealing contact at both the bottom and top of sealing ring 11 where it engages with the flanges 20 and 21. The installation of Fig. 3 is illustrated at room temperature, and it will be noted that the ring 11 is deformed and flattened so as to fit within the channel defined by the retaining members. This deformation of ring 11 causes internal pressures to be created which exert strong sealing forces both upwardly and downwardly to establish the desired lines of sealing contact. As was mentioned, the volumetric relationship between ring 11 and the confining channel is such that the ring may fit within the channel as it is flattened. In actual practice, it is desirable that the volume of the retaining channel be somewhat greater than that of the sealing ring 11 so that the corners of the sealing ring need not be fully flattened and may maintain a rounded configuration to avoid cracking or shearing of the material.

Figure 4:
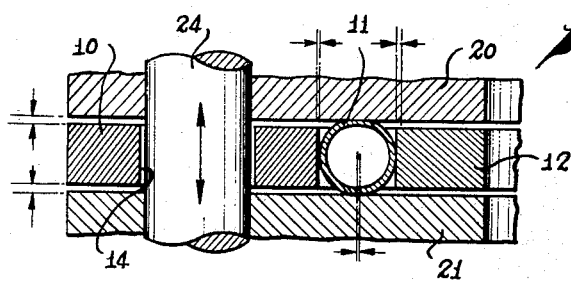
Fig. 4 is a detail showing the device of Fig. 3 under an extreme high temperature.

The extreme temperature, under which the seal is to be utilized may be either a high or low temperature and different embodiments of the invention will be used for such different design temperatures. Fig. 4, shows a specific embodiment of the invention designed for utilization in a high temperature installation. In a high temperature installation, there is a tendency for flanges 20 and 21 to separate from retaining members 10 and 12 due to the elongation of the retaining bolts 24. This separation of the flanges 20 and 21 as is shown by the diagrammatic arrows, tends to cause a loss of sealing pressure along the lines of sealing contact established by ring 11, and leakage across the ring may occur. To prevent such leakage, the outer retaining member 10 is formed of a material having one coefficient of expansion, and the inner retainer 12 is formed of the material having a different and greater coefficient of expansion.

Upon thermal expansion it will thus be seen that the inner retainer 12 expands relatively more than the outer retainer 10, the relative amounts of such expansion being illustrated by the diagrammatic arrows above the edges of the retaining channel. The effect of this is to decrease the width of the channel defined between the walls 15 and 16, and to exert an inward squeeze on the sides of ring 11. This causes ring 11 to deform or elongate vertically so as to exert a greater sealing force upwardly and downwardly against flanges 20 and 21. In a typical specimen of the invention, an austenitic stainless steel is used for the inner retainer 12 and the ring 11. The outer retainer 10 is formed of a martensitic stainless steel having a considerably lower coefficient of thermal expansion. This difference in material provides the necessary differential expansion and insures full sealing pressure at temperatures well in excess of 400° F.

Figure 5:
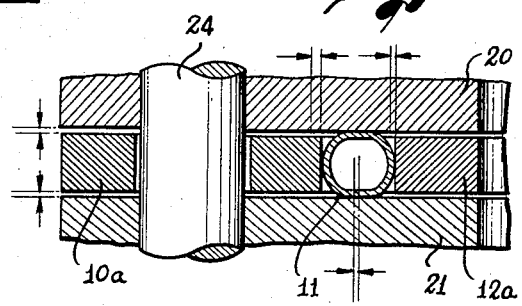
Fig. 5 is a detail similar to Fig. 4 illustrating another embodiment of the invention under an extreme low temperature.

In Fig. 5 a different embodiment of the invention specifically designed for low temperature installations is illustrated under conditions of usage. In low temperature installations, the loss of sealing pressure may occur, if the flanges 20 and 21, for example, are formed of a material having a greater coefficient of expansion than the retaining bolts 24. Such a situation will occur in practice if the bolts 24 are formed of steel and the flanges 20 and 21 are aluminum. The contraction of the flanges 20 and 21 will open up clearance between them and the outer and inner retainers 10a and 12a, respectively. These retainers are identical to those previously described except for the use of different materials to cause a greater relative amount of contraction in the outer retainer 10a than in the inner retainer 12a. For example, if the materials described in the form illustrated in Fig. 4 are reversed, when a very low temperature is reached outer retainer 10a will have contracted a relatively greater amount than inner retainer 12a. The effect of this is to narrow the width of the confining channel, and again cause vertical deformation of sealing ring 11 so as to increase the sealing pressure against flanges 20 and 21. It will be understood of course, that the selection of materials for the ring 11 in the inner and outer retaining rings varies in accordance with the design temperature for the sealing installation, and the materials which are utilized in the flanges and the securing fasteners.

Figure 6:
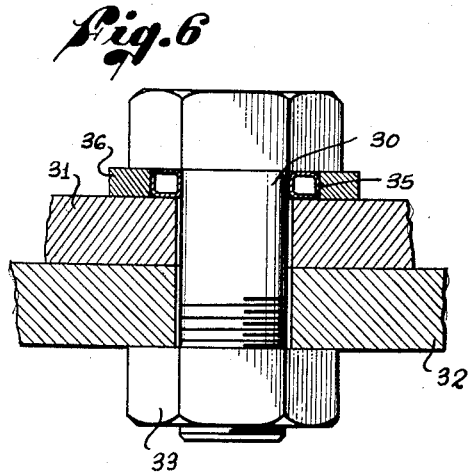
Fig. 6 is a sectional detail illustrating the installation of another form of the invention.

In Fig. 6, the different structural embodiment of the invention for use in sealing around the shank and under the head of a securing fastener is illustrated. As is shown therein, the securing fastener 30 is passed through openings in plates 31 and 32 which form the wall of a fluid tight structure such as a tank. Bolt 30 is held in place by nut 33, and in order to prevent leakage through the wall of the tank it is necessary to seal around the opening through which the bolt shank passes. To this end an embodiment of the invention comprising a ring 35 and retainer 36 is placed in a position surrounding the shank of bolt 30 and under the head thereof. The dimensional relationship of ring 35 to retainer 36 is the same as that previously described, and in addition ring 35 is of such size that its inner periphery engages against the shank of bolt 30. Upon installation at room temperature as is illustrated in Fig. 6, it will be seen that ring 35 is deformed from its original shape and makes sealing contact against the underside of bolt head 30 and also against the inner wall of retainer 36, the outer surface of plate 31, and the shank of bolt 30. These lines of sealing contact positively prevent any fluid leakage through the tank structure.

Depending upon the extreme temperature conditions which are to be encountered, the material of retainer 36 is selected to have a greater or lesser coefficient of expansion than the material of bolt 30. For a high temperature installation retainer 36 is selected of a material having a lesser coefficient of expansion than the material of bolt 30 and the width of the retaining channel is thus decreased upon a temperature rise. For a low temperature installation, retainer 36 is selected of a material having a greater coefficient of expansion than the material of bolt 30. Thus upon low temperature contraction, the width of the retaining channel is decreased and sealing pressure is maintained or increased. It will therefore be appreciated that the sealing principles embodied in this form of the invention are the same as those for the preferred form although the structural configuration of the invention is somewhat different.

While I have thus illustrated and described in some detail preferred and modified forms of the invention it is to be understood that other modifications and changes in design and construction will be apparent to those skilled in the art. Therefore, I do not wish to be restricted to the foregoing description, except as is defined in the appended claims.

I claim:

1. In a sealing device for use in an extreme temperature condition: a semi-rigid ring formed of a material which will withstand said extreme temperature; an outer flat rigid retaining member of less thickness than said ring surrounding said ring and adapted to engage the outer periphery of said ring; and an inner member separate from said outer member and said ring and adapted to engage the inner periphery of said ring, said outer member and said inner member being formed of materials having different coefficients of expansion and being selectively positioned to move towards each other and squeeze on said ring under said extreme temperature.

2. In a sealing device for use in an extreme temperature condition: a semi-rigid ring formed of a material which will withstand said extreme temperature; an outer flat rigid retaining member of less thickness than said ring surrounding said ring and adapted to engage the outer periphery of said ring; and an inner member separate from said outer member and said ring and adapted to engage the inner periphery of said ring and to define with said outer member a channel having a volume substantially equal to the volume of said ring at room temperature, said outer member and said inner member being formed of materials having different coefficients of expansion and being selectively positioned to exert a differential squeeze on said ring under said extreme temperature.

3. In a sealing device for use in an extreme temperature condition: a hollow torus shaped ring formed of a material which will retain resiliency at said extreme temperature; an outer flat rigid retaining member of less thickness than said ring having a circular inner edge engaging the outer periphery of said ring; and an inner member separate from said outer member and said ring and having a circular outer edge adapted to engage the inner periphery of said ring, said outer member and said inner member being formed of materials having different coefficients of expansion and being selectively positioned to move towards each other under said extreme temperature.

4. In a sealing device for use in an extreme temperature condition: a metallic hollow ring of rounded cross section; an outer flat rigid retaining member of less thickness than said ring having a circular inner edge engaging the outer periphery of said ring; and an inner rigid member separate from said outer member and said ring and having a circular outer edge engaging the inner periphery of said ring and defining with said outer member a channel of rectangular cross section having a volume substantially equal to the volume of said ring at room temperature, said outer member and said inner member being formed of materials having different coefficients of expansion and being selectively positioned to move towards each other under said extreme temperature.

5. In a sealing device for use in a high temperature installation: a metallic hollow ring of rounded cross section; an outer flat rigid retaining member of less thickness than said ring having a circular inner edge engaging the outer periphery of said ring, said retaining member being formed of a material having a given coefficient of expansion; and an inner member separate from said outer member and said ring and having a circular outer edge adapted to engage the inner periphery of said ring, said inner member being formed of a material having a greater coefficient of expansion than said given coefficient of expansion.

6. In a sealing device for use in a low temperature installation: a metallic hollow ring of rounded cross section; an outer flat rigid retaining member of less thickness than said ring having a circular inner edge engaging the outer periphery of said ring, said retaining member being formed of a material having a given coefficient of expansion; and an inner member separate from said outer member and said ring and having a circular outer edge adapted to engage the inner periphery of said ring, said inner member being formed of a material having a smaller coefficient of expansion than said given coefficient of expansion.

7. In a sealing device for use in an extreme temperature condition: a hollow metallic torus shaped ring; an outer flat metal retaining member of less thickness than said ring having a cylindrical inner edge engaging the outer periphery of said ring; and an inner flat metal retaining member separate from said outer member and said ring and having a cylindrical outer edge engaging the inner periphery of said ring and defining with said outer member an annular channel of rectangular cross section, said outer member and said inner member being formed of materials having different coefficients of expansion and being selectively positioned to move towards each other under said extreme temperature.

8. In a sealing device for use in an extreme temperature condition: a metallic hollow ring of rounded cross section; an outer flat metal retaining member of less thickness than said ring having a cylindrical inner edge engaging the outer periphery of said ring; and an inner flat annular metal member separate from said ring and said outer member and of the same thickness as said outer member; said inner member having a cylindrical outer edge engaging the inner periphery of said ring and defining with said outer member an annular channel of rectangular cross section, said outer member and said inner member being formed of materials having different coefficients of expansion and being selectively positioned to move towards each other under said extreme temperature.

9. A sealing device for use around the shank and under the head of a fastener in an extreme temperature installation which comprises: a hollow metallic torus shaped ring having its inner periphery adapted to engage the shank of a fastener; and a separate outer flat metal retaining member of less thickness than said ring having a cylindrical inner edge engaging the outer periphery of said ring, said outer member being formed of a material having a different coefficient of expansion than the material of said fastener and selected to move towards said fastener shank under said extreme temperature.

References Cited in the file of this patent

UNITED STATES PATENTS

| | | |
|---|---|---|
| 1,295,263 | Blom | Feb. 25, 1919 |
| 2,520,089 | Lippincott | Aug. 22, 1950 |
| 2,544,664 | Garner et al. | Mar. 13, 1951 |
| 2,553,222 | Wallgren et al. | May 15, 1951 |
| 2,596,839 | Clausen | May 13, 1952 |
| 2,717,793 | Nenzell | Sept. 13, 1955 |

FOREIGN PATENTS

| | | |
|---|---|---|
| 474,238 | Great Britain | Oct. 27, 1937 |